(12) United States Patent
Shaio et al.

(10) Patent No.: US 6,571,338 B1
(45) Date of Patent: *May 27, 2003

(54) MAINTAINING PACKET SECURITY IN A COMPUTER NETWORK

(75) Inventors: Sami Shaio, San Francisco, CA (US); Arthur Van Hoff, Mountain View, CA (US)

(73) Assignee: Sun Microsystems Inc., Mountain View, CA (US)

( * ) Notice: Subject to any disclaimer, the term of this patent is extended or adjusted under 35 U.S.C. 154(b) by 1347 days.

This patent is subject to a terminal disclaimer.

(21) Appl. No.: 08/575,743

(22) Filed: Dec. 20, 1995

(51) Int. Cl.$^7$ .................................................. H04L 9/00
(52) U.S. Cl. ........................................ 713/201; 713/153
(58) Field of Search ...................... 395/187.01, 188.01, 395/186, 609, 200.68, 200.69, 200.7, 200.72, 200.73, 200.74; 380/23, 25; 707/9, 10; 713/201, 153, 154, 160, 161

(56) References Cited

U.S. PATENT DOCUMENTS

| | | | | |
|---|---|---|---|---|
| 5,113,499 A | * | 5/1992 | Ankney et al. | 395/325 |
| 5,311,593 A | * | 5/1994 | Carmi | 370/400 |
| 5,400,334 A | * | 3/1995 | Hayssen | 370/85.4 |
| 5,414,694 A | * | 5/1995 | Crayford et al. | 370/13.1 |
| 5,438,568 A | * | 8/1995 | Weisser, Jr. | 370/389 |
| 5,530,758 A | * | 6/1996 | Marino, Jr. et al. | 380/49 |
| 5,548,649 A | * | 8/1996 | Jacobson | 380/49 |
| 5,550,984 A | * | 8/1996 | Gelba | 395/187.01 |
| 5,559,883 A | * | 9/1996 | Williams | 380/4 |
| 5,572,533 A | * | 11/1996 | Sunada et al. | 371/20.1 |
| 5,572,643 A | * | 11/1996 | Judson | 395/774 |
| 5,581,559 A | * | 12/1996 | Crayford et al. | 395/186 |
| 5,590,285 A | * | 12/1996 | Krause et al. | 395/200.2 |
| 5,615,340 A | * | 3/1997 | Dai et al. | 395/200.17 |
| 5,623,600 A | * | 4/1997 | Ji et al. | 395/187.01 |
| 5,623,601 A | * | 4/1997 | Vu | 395/187.01 |
| 5,638,515 A | * | 6/1997 | Futral | 395/200.11 |

* cited by examiner

Primary Examiner—Scott Baderman
(74) Attorney, Agent, or Firm—Kang S. Lim, Esq.; James D. Ivey, Esq.

(57) ABSTRACT

The present invention provides a method and apparatus for determining the trust worthiness of executable packets, e.g., internet applets, being transmitted within a computer network. The computer network includes both secured computers and unsecured computers, which are associated with secured nodes and unsecured nodes, respectively. Each executable packet has a source address and a destination address. In one embodiment, an intelligent firewall determines within a first degree of certainty whether the source address of an executable packet arriving at one of the secured computers is associated with anyone of the secured nodes, and also determines within a second degree of certainty whether the destination address of the executable packet is associated with anyone of the secured nodes. If the firewall determines within the first degree of certainty that the source address is associated with anyone of the secured nodes, and further determines within the second degree of certainty or is uncertain whether the destination address is associated with anyone of the secured nodes, then the firewall permits the executable packet to execute on the secured computer. Alternatively, if the firewall determines within the first degree of certainty or is uncertain whether the source address is associated with anyone of the secured nodes, and further determines within the second degree of certainty that the destination address is not associated with anyone of the secured nodes, then the firewall also permits the executable packet to proceed to the secured computer.

20 Claims, 7 Drawing Sheets

MAINTAINING PACKET SECURITY IN A COMPUTER NETWORK

BACKGROUND OF THE INVENTION

1. Field of the Invention

This invention relates to the field of security in a computer network. More particularly, the present invention relates to the field of packet security in a wide area network (WAN). An example of a byte code verifier system that can be used in connection with the present invention is disclosed in the following copending patent application, which is incorporated herein by reference: "BYTECODE PROGRAM INTERPRETER APPARATUS AND METHOD WITH PREVERIFICATION OF DATA TYPE RESTRICTIONS AND OBJECT INITIALIZATION", Ser. No. 08/575,291, by Frank Yellin and James Gosling, filed on the same day as the present application.

2. Description of the Related Art

Figure 1A:
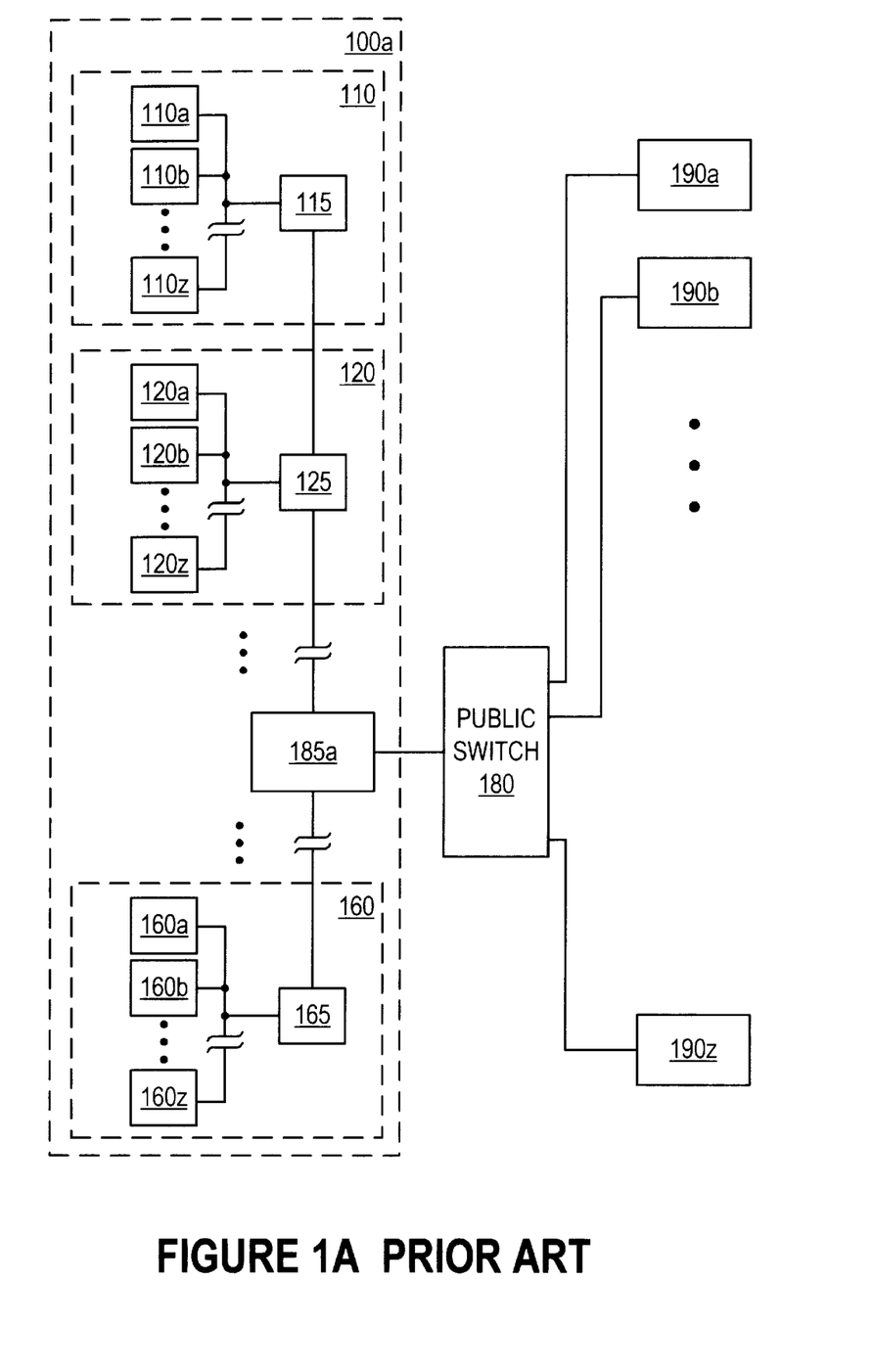
FIG. 1A is a block diagram of a typical computer network.

FIG. 1A illustrates a typical computing environment wherein clusters of secured computers $110a, 110b, \ldots 100z$, $120a, 120b, \ldots 120z, \ldots 160a, 160b, \ldots 160z$ are coupled to each other to form local area networks (LANs) $110$, $120, \ldots 160$, respectively. Exemplary technologies employed for interconnecting LANs include Ethernet and Token-ring. In turn, LANs $110, 120, \ldots 160$ can be coupled to each other via network nodes $115, 125, \ldots, 165$ to form a secured wide area network (SWAN) $100a$. Typical SWAN links include dedicated leased lines and satellite links which are less vulnerable to attack than public networks in general.

In most commercial computing implementations, security is maintained by identifying internal computers whose use can be closely monitored, e.g., secured computers $110a$, $110b, \ldots 110z, 120a, 120b, \ldots 120z, \ldots 160a, 160b, \ldots 160z$, and also by enforcing a strict policy of not allowing any new executable programs to be executed in any one of the secured computers until these new programs have been verified as virus-free. Viruses can cause a variety of problems such as damage to hardware, software, and/or data, release information to unauthorized personnel, and/or cause a host computer to become unusable through resource depletion.

Unfortunately, most commercial networks have a need to be connected to external unsecured computers, such as the computers of telecommuting-employees and customers. For example, SWAN $100a$ may be coupled to external unsecured computers $190a, 190b, \ldots 190z$ via an externally-accessible node $185a$ and a public switch $180$.

As this need to connect SWAN $100a$ to an increasing number of unsecured computers $190a, 190b, 190z$ via public switch $180$ grows, the problem of guarding the secured computers of SWAN $100a$ against unauthorized data access and/or data corruption becomes increasing difficult. This problem is compounded by the proliferation of computers coupled to publicly and freely accessible WANs such as the Internet. Hence, externally accessible node $185a$, the weakest point of the otherwise-secure SWAN $100a$, is increasingly vulnerable to hackers.

Several techniques have been developed to minimize the vulnerability of node $185a$ to any uninvited intrusion. For example as discussed above, whenever possible, dedicated trunk lines of switch $180$ are used to connect node $185a$ to unsecured computers $190a, 190b, \ldots 190z$. A less costly but less secure alternative is the enforcement of a dialback protocol over a public network, in which an unsecured computer, e.g., computer $190a$, dials up node $185a$, and then identifies the remote user's identity and location before hanging up. Subsequently, node $185a$ dials back computer $190a$ at its pre-authorized location using a pre-authorized telephone number to ensure that the remote user is indeed located at the preauthorized location.

Additional security at the packet level can also be provided at node $185a$, wherein node $185a$ functions as a dumb "firewall" which allows only pure ASCII files, e.g., textual emails, and prohibits all attachments of the emails from leaving and/or entering SWAN $100a$. Alternatively, node $185a$ may scan all incoming packets to identify and prevent any untested executable code from entering SWAN $100a$.

Although the above-described security measures work fairly well for the exchange of data packets between SWAN $100a$ and unsecured computers $190a, 190b, \ldots 190z$, they are too cumbersome and/or inadequate for exchanging packets which include executable code. For example, in receiving an executable Internet application based on Hot Java, a programming language that supports executable applets, such a broad prohibition of executable code will effectively prevent any untested Hot Java applets from being received and subsequently executed.

Hence, there is a need for an intelligent firewall that provides real-time security testing of network packets, which may include executable code such as applets, and determines the risk level, i.e, trust worthiness, of each packet before permitting a lower-risk subset of the network packets to execute on anyone of the secured computers of SWAN $100a$ in a manner transparent to a user.

SUMMARY OF THE INVENTION

The present invention provides a method and apparatus for determining the trust worthiness of executable packets, e.g., internet applets, being transmitted within a computer network. The computer network includes both secured computers and unsecured computers, which are associated with secured nodes and unsecured nodes, respectively. Each executable packet has a source address and a destination address.

In one embodiment, an intelligent firewall determines within a first degree of certainty whether the source address of an executable packet arriving at one of the secured computers is associated with anyone of the secured nodes, and also determines within a second degree of certainty whether the destination address of the executable packet is associated with anyone of the secured nodes.

If the firewall determines within the first degree of certainty that the source address is associated with anyone of the secured nodes, and further determines within the second degree of certainty or is uncertain whether the destination address is associated with anyone of the secured nodes, then the firewall permits the executable packet to proceed to the secured computer.

Alternatively, if the firewall determines within the first degree of certainty or is uncertain whether the source address is associated with anyone of the secured nodes, and further determines within the second degree of certainty that the destination address is not associated with anyone of the secured nodes, then the firewall also permits the executable packet to proceed to the secured computer.

In another embodiment, the intelligent firewall determines within the first degree of certainty whether the source address of an executable packet arriving at one of the secured computers is associated with anyone of the secured nodes, or determines within the second degree of certainty whether the destination address of the executable packet is associated with anyone of the secured nodes.

If the firewall determines within the first degree of certainty that the source address is associated with anyone of the secured nodes, then the firewall permits the executable packet to proceed to the secured computer. Alternatively, the firewall determines within the second degree of certainty whether the destination address of the executable packet is associated with anyone of the secured nodes, then the firewall also permits the executable packet to proceed to the secured computer.

In the above-described embodiments, if none of the above-described trust-worthiness conditions are satisfied, then the firewall rejects the executable packet, thereby minimizing the risk of damage to the secured computer.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the invention. These details include functional blocks and exemplary algorithms to assist one in implementing an intelligent network firewall. In addition, while the present invention is described with reference to a specific computer network architecture and firewall algorithms for protecting the network, the invention is applicable to a wide range of network architectures and environments. In other instances, well-known circuits and structures are not described in detail so as not to obscure the invention unnecessarily.

Figure 1B:
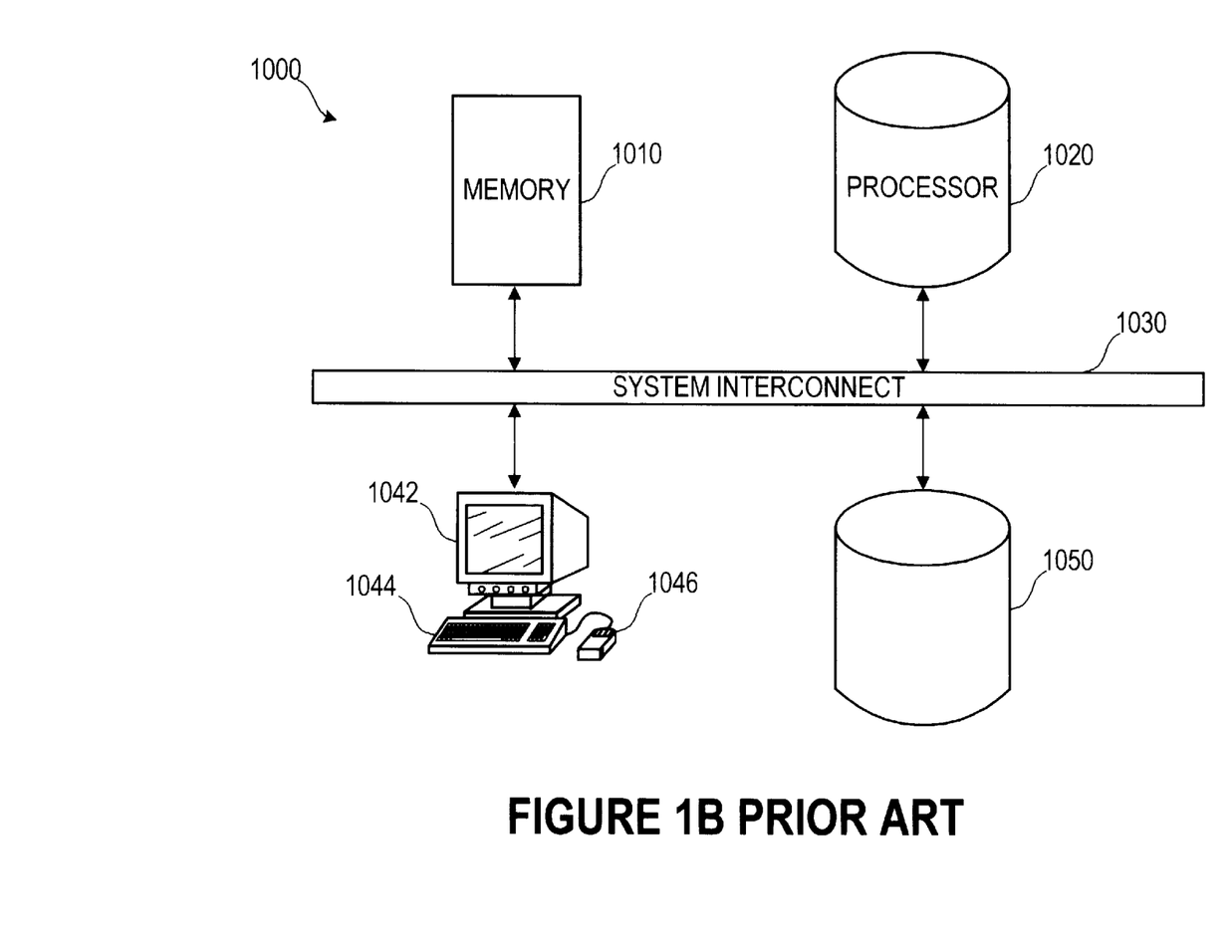
FIG. 1B is a block diagram of a general purpose computer system.
Figure 1C:
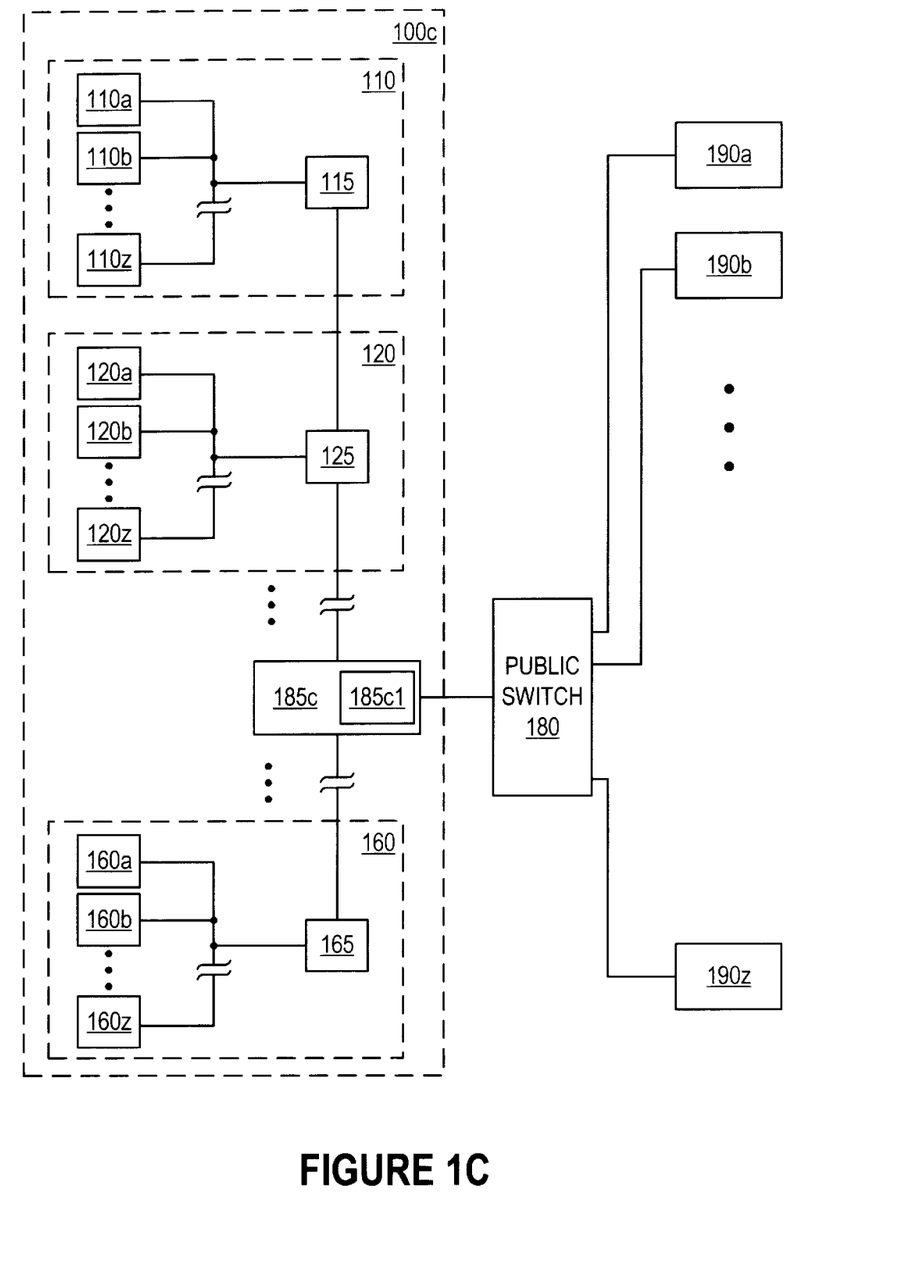
FIG. 1C is a block diagram of a computer network of the present invention.

FIG. 1C illustrates a secured wide area network (SWAN) 100c of the present invention, which includes clusters of secured computers 110a, 110b, . . . 110z, 120a, 120b, . . . 120z, . . . 160a, 160b, . . . 160z, coupled to each other to form local area networks (LANs) 110, 120, . . . 160, respectively. LANs 110, 120, . . . 160 can be coupled to each other via network nodes 115, 125, . . . , 165. SWAN 100c is coupled to external unsecured computers 190a, 190b, . . . 190z via an externally-accessible network node 185c and a public switch 180.

In accordance with the present invention, node 185c includes an intelligent firewall 185c1. Node 185c can be the general purpose computer 1000 of FIG. 1B or a dedicated network packet router (not shown) suitable for implementing firewall 185c1. For the purpose of illustrating the following examples, "outside firewall 185c1" is equivalent to outside secured wide area network (SWAN) 100c.

Figure 2A:
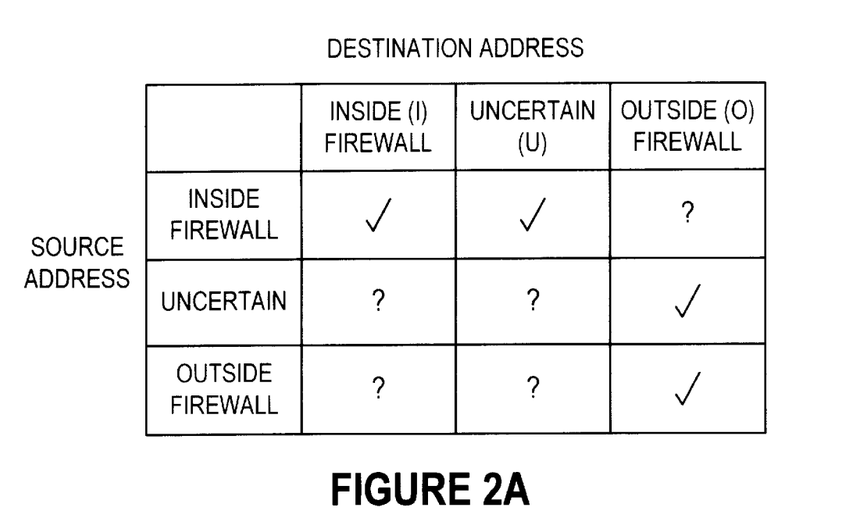
FIGS. 2A, 2B and 2C are a truth table, a block diagram and a flowchart, respectively, illustrating one embodiment of the intelligent firewall of the present invention.
Figure 2B:
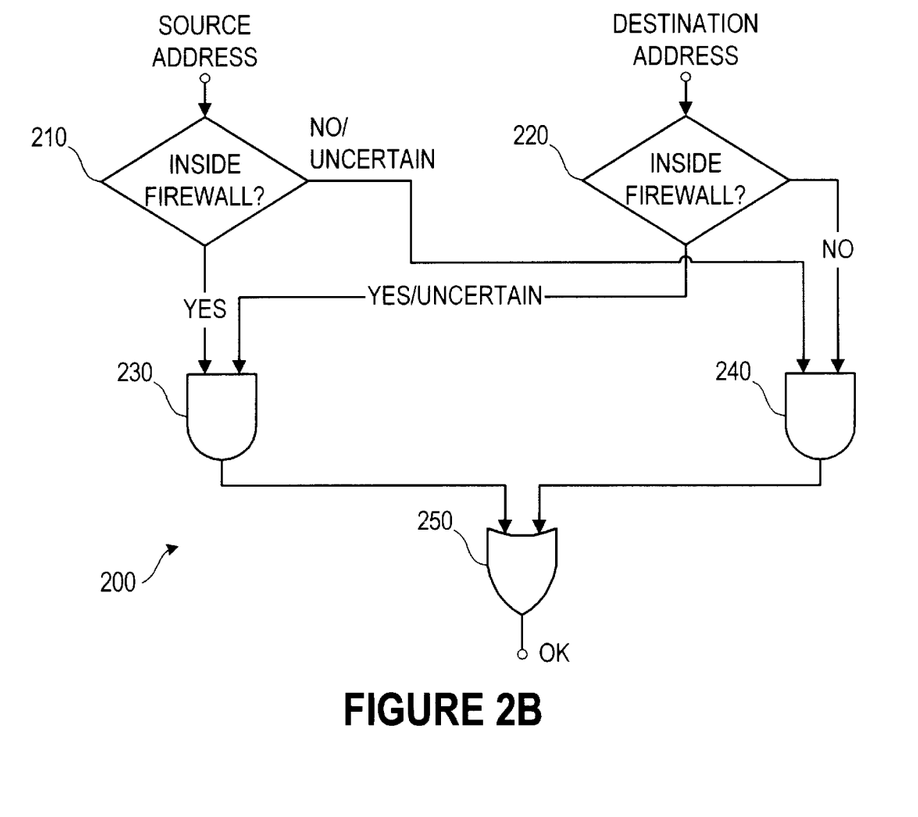
Figure 2C:
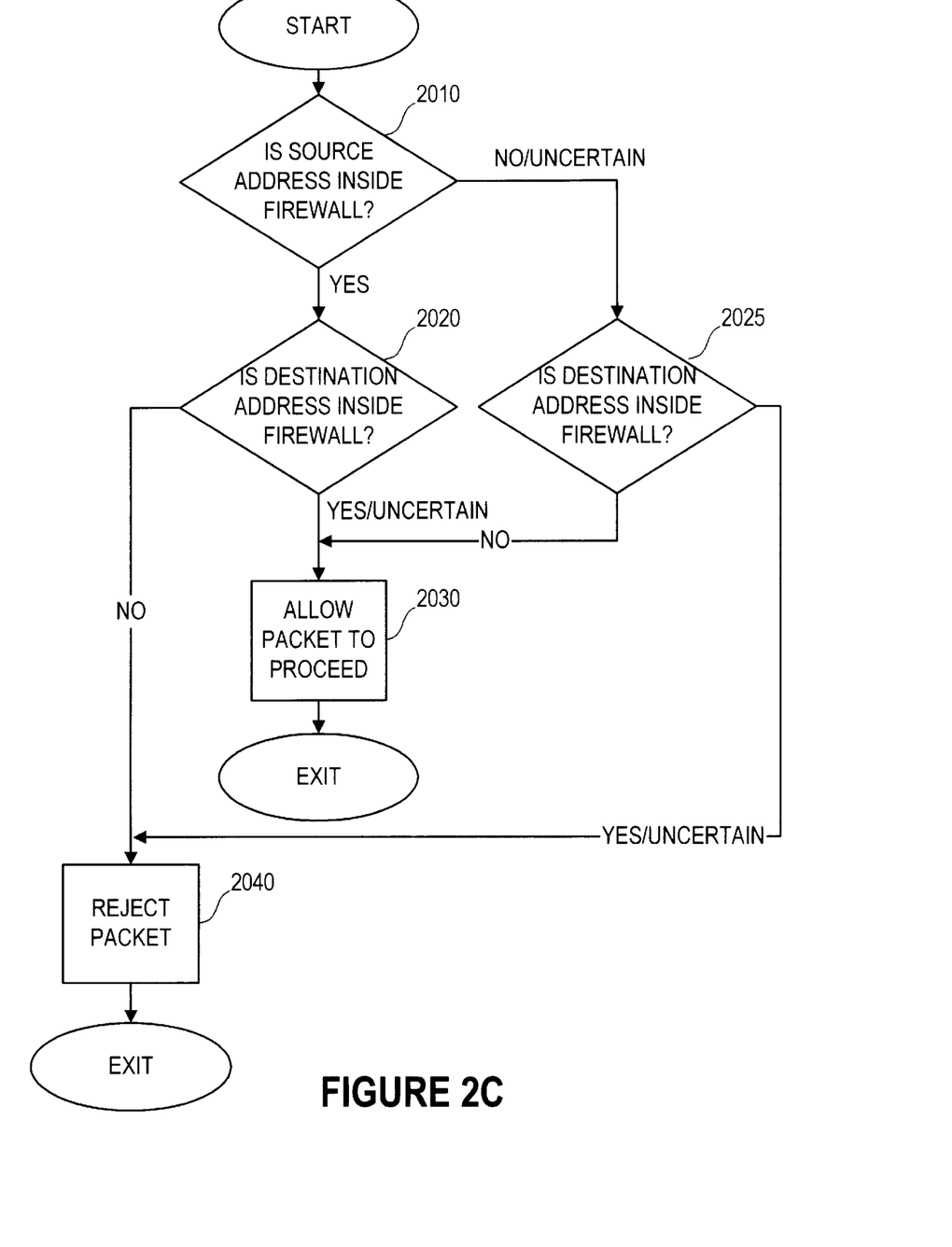

FIGS. 2A, 2B and 2C are a truth table, a block diagram and a flowchart, respectively, illustrating the operation of one embodiment of intelligent firewall 185c1. Appendix A is an exemplary pseudo-code implementation of this embodiment.

Referring to the flowchart of FIG. 2C, when firewall 185c1 receives an incoming or an outgoing network packet, an examination of the source address of the network packet is performed (step 2010).

If firewall 185c1 determines within a degree of certainty that the source address identifies the packet as originating from one of the secured computer systems within SWAN 100c, and upon examination of the destination address of the packet (step 2020), firewall 185c1 is uncertain or determines that the destination address of the packet is inside SWAN 100c, then the packet is allowed to proceed (step 2030). Alternatively, if firewall 185c1 is either uncertain or determines that the source address is outside SWAN 100c, and upon examination of the destination address of the packet (step 2025), firewall 185c1 determines within a degree of certainty that the destination address of the packet is outside SWAN 100c, then the packet is also allowed to proceed (step 2030).

Conversely, if firewall 185c1 is uncertain or determines that the source address of the packet is outside SWAN 100c, and upon examination of the destination address (step 2025), is uncertain or determines that the destination address of the packet is inside SWAN 100c, then the packet is rejected, i.e., prevented from proceeding to anyone of the secured computers of SWAN 100c (step 2040). Similarly, if firewall 185c1 determines within a degree of certainty that the source address identifies the packet as originating from one of the secured computer systems inside SWAN 100c, and upon examination of the destination address of the packet (step 2020), determines that the destination address of the packet is outside SWAN 100c, then the packet is also rejected (step 2040).

In this embodiment, a source/destination network address is considered uncertain if there is no match between the network address and a list of pre-approved secured network addresses inside SWAN 100c. Other definitions of uncertainty are possible. For example, network addresses may include a prefix field and a machine field, with the prefix field identifying clusters of computer systems coupled to the respective network nodes, and the machine field identifying computer systems within each cluster. Hence, even though firewall 185c1 may recognize the prefix field of the packet as one associated with a secured network node within SWAN 100c, if the machine field of the same packet does not match one of the pre-approved identifiers, the result is a partial match and the network address of the packet is considered an uncertain address by firewall 185c1.

Figure 3A:
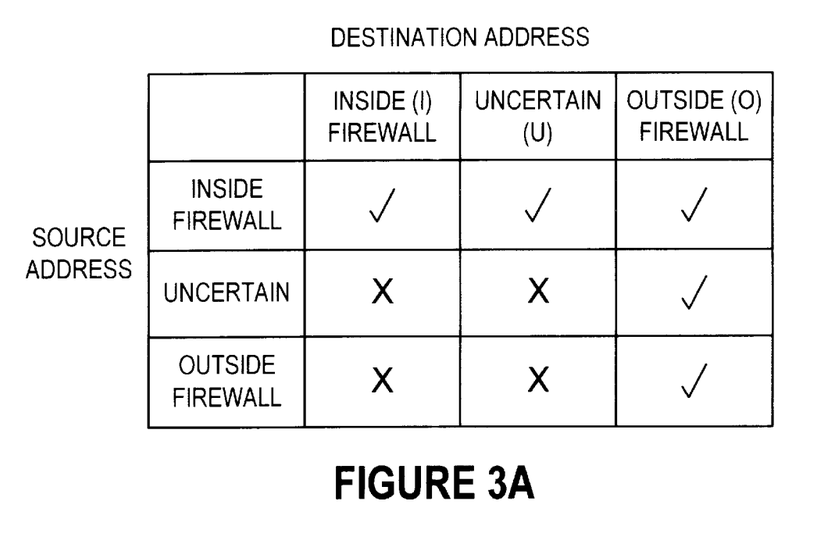
FIGS. 3A, 3B and 3C are a truth table, a block diagram and a flowchart, respectively, illustrating another embodiment of the intelligent firewall of the present invention.
Figure 3B:
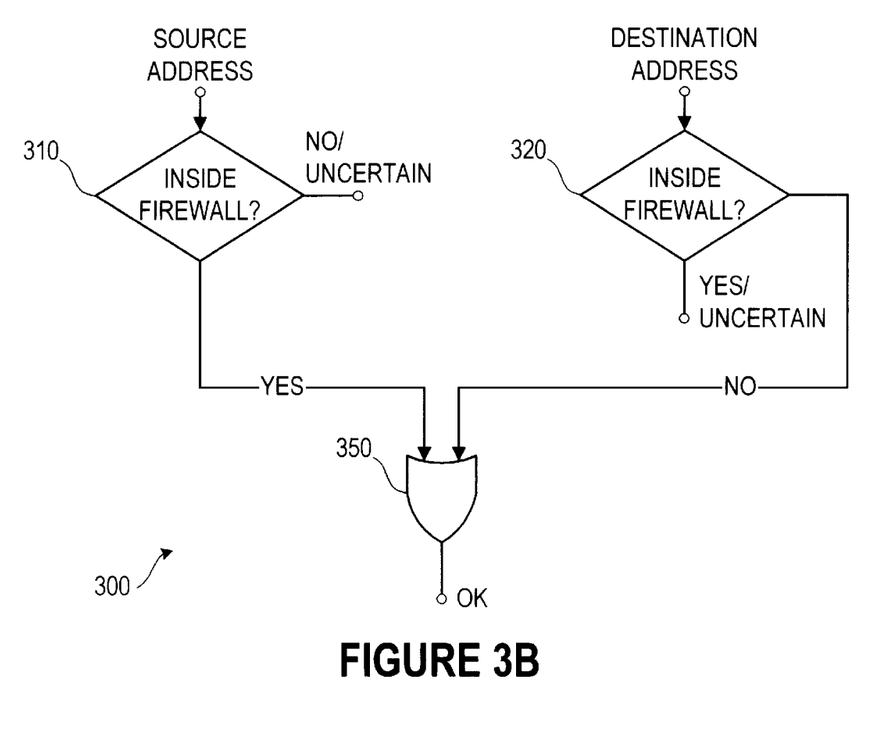
Figure 3C:
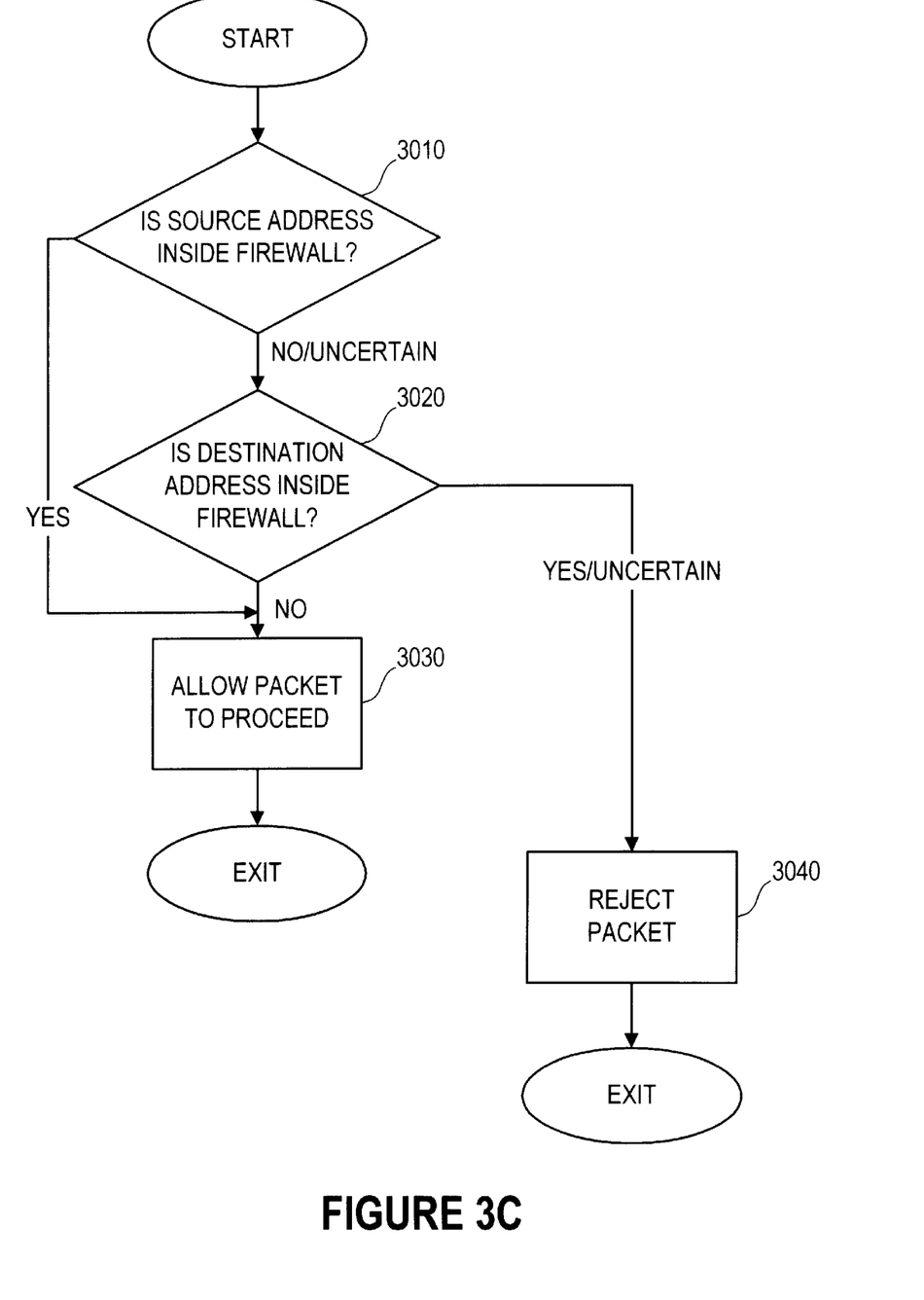

FIGS. 3A, 3B and 3C are a truth table, a block diagram and a flowchart, respectively, illustrating the operation of another embodiment of intelligent firewall 185c1. Referring to the flowchart of FIG. 3C, when firewall 185c1 receives an incoming or an outgoing network packet, an examination of the source address of the network packet is performed (step 3010).

If firewall 185c1 determines within a degree of certainty that the source address identifies the packet as originating from one of the secured computer systems inside SWAN 100c, then the packet is allowed to proceed (step 3030). Alternatively, if firewall 185c1 is either uncertain or determines that the source address of the packet is outside SWAN 100c, and upon examination of the destination address of the packet (step 3020), firewall 185c1 determines within a degree of certainty that the destination address of the packet is outside SWAN 100c, then the packet is allowed to proceed (step 3030).

Conversely, if firewall 185c1 is uncertain or determines that the source address of the packet is outside SWAN 100c, and upon examination of the destination address (step 3020), is uncertain or determines that the destination address of the packet is inside SWAN 100c, then the packet is rejected (step 3040).

Additional security may be provided by intelligent firewall 185c1. For example, a byte code verifier may parse the executable code portion of the packet to eliminate invalid and/or non-conforming instructions in an attempt to reduce the probability of viruses. An example of a byte code verifier system that can be used in connection with the present invention is disclosed in the above-mentioned copending patent application, entitled: "BYTECODE PROGRAM INTERPRETER APPARATUS AND METHOD WITH PRE-VERIFICATION OF DATA TYPE RESTRICTIONS AND OBJECT INITIALIZATION". Other modifications and additions are also possible without departing from the spirit of the invention. Accordingly, the scope of the invention should be limited by the following claims.

What is claimed is:

1. A method for determining the trust worthiness of executable packets in a computer network having a plurality of secured computers and a plurality of unsecured computers, each executable packet having a source address and a destination address, said method comprising the steps of:
    a) determining within a first degree of certainty whether a source address of one said executable packet is associated with anyone of said plurality of secured computers, said source address is not associated with anyone of said plurality of secured computers, or association of said source address with anyone of said plurality of secured computers is uncertain; and
    b) determining within a second degree of certainty whether a destination address of said one executable packet is associated with anyone of said plurality of secured computers, said destination address is not associated with anyone of said plurality of secured computers, or association of said destination address with anyone of said plurality of secured computers is uncertain.

2. The method of claim 1 wherein if the determining step a) determines within said first degree of certainty that said source address is associated with anyone of said plurality of secured computers and if the determining step b) determines within said second degree of certainty or is uncertain whether said destination address is associated with anyone of said plurality of secured computers, then the method further comprises the step of permitting said executable packet to proceed.

3. The method of claim 1 wherein if the determining step a) determines within said first degree of certainty or is uncertain whether said source address is associated with anyone of said plurality of secured computers and if the determining step b) determines within said second degree of certainty that said destination address is not associated with anyone of said plurality of secured computers, then the method further comprises the step of permitting said executable packet to proceed.

4. The method of claim 1 wherein if the determining step a) determines within said first degree of certainty or is uncertain whether said source address is not associated with anyone of said plurality of secured computers and if the determining step b) determines within said second degree of certainty or is uncertain whether said destination address is associated with anyone of said plurality of secured computers, then the method further comprises the step of prohibiting said executable packet from proceeding.

5. The method of claim 1 wherein said executable packet includes an applet.

6. The method of claim 1 wherein said determining steps a) and b) are executed by an intelligent firewall associated with said plurality of secured computers.

7. A method for determining the trust worthiness of executable packets in a computer network having a plurality of secured computers and a plurality of unsecured computers, each executable packet having a source address and a destination address, said method comprising the step of:
    determining within a degree of certainty whether a source address of one said executable packet is associated with anyone of said plurality of secured computers, said source address is not associated with anyone of said plurality of secured computers, or association of said source address with anyone of said plurality of secured computers is uncertain.

8. The method of claim 7 wherein if the determining step determines within said degree of certainty that said source address is associated with anyone of said plurality of secured computers, then the method further comprises the step of permitting said executable packet to proceed.

9. The method of claim 7 wherein said executable packet includes an applet.

10. The method of claim 7 wherein said determining step is executed by an intelligent firewall associated with said plurality of secured computers.

11. A method for determining the trust worthiness of executable packets in a computer network having a plurality of secured computers and a plurality of unsecured computers, each executable packet having a source address and a destination address, said method comprising the step of:
    determining within a degree of certainty whether a destination address of one said executable packet is associated with anyone of said plurality of secured computers, said destination address is not associated with anyone of said plurality of secured computers, or association of said destination address with anyone of said plurality of secured computers is uncertain.

12. The method of claim 11 wherein if the determining step determines within said degree of certainty that said destination address is not associated with anyone of said plurality of secured computers, then the method further comprises the step of permitting said executable packet to proceed.

13. The method of claim 11 wherein said executable packet includes an applet.

14. The method of claim 11 wherein said determining step is executed by an intelligent firewall associated with said plurality of secured computers.

15. An intelligent firewall useful in association with a computer network having a plurality of secured computers and a plurality of unsecured computers, the firewall comprising:
    a source address verifier configured to determine within a first degree of certainty whether a source address of an executable packet is associated with anyone of said plurality of secured computers, said source address is not associated with anyone of said plurality of secured computers, or association of said source address with anyone of said plurality of secured computers is uncertain.

16. The intelligent firewall of claim 15 further comprising:

a destination address verifier configured to determine within a second degree of certainty whether a destination address of said executable packet is associated with anyone of said plurality of secured computers.

17. An intelligent firewall useful in association with a computer network having a plurality of secured computers and a plurality of unsecured computers, the firewall comprising:

a destination address verifier configured to determine within a degree of certainty whether a destination address of an executable packet is associated with anyone of said plurality of secured computers, said destination address is not associated with anyone of said plurality of secured computers, or association of said destination address with anyone of said plurality of secured computers is uncertain.

18. A computer program product including a computer-usable medium having computer-readable code embodied therein configured to verify addresses of a plurality of executable packets for a computer network, the computer network including a plurality of secured computers and a plurality of unsecured computers, the computer-readable code comprising a computer-readable source address verifier configured to determine within a first degree of certainty whether a source address of one said executable packet is associated with anyone of said plurality of secured computers, said source address is not associated with anyone of said plurality of secured computers, or association of said source address with anyone of said plurality of secured computers is uncertain.

19. The computer program product of claim 18 wherein said computer-readable code further comprising:

a computer-readable destination address verifier configured to determine within a second degree of certainty whether a destination address of said one executable packet is associated with anyone of said plurality of secured computers.

20. A computer program product including a computer-usable medium having computer-readable code embodied therein configured to verify addresses of a plurality of executable packets for a computer network, the computer network including a plurality of secured computers and a plurality of unsecured computers, the computer-readable code comprising:

a computer-readable destination address verifier configured to determine within a degree of certainty whether a destination address of one said executable packet is associated with anyone of said plurality of secured computers, said destination address is not associated with anyone of said plurality of secured computers, or association of said destination address with anyone of said plurality of secured computers is uncertain.

* * * * *